United States Patent
Jia et al.

(10) Patent No.: US 9,052,701 B1
(45) Date of Patent: Jun. 9, 2015

(54) DISK DRIVE MEASURING A RESONANCE MODE BY INJECTING SINUSOIDS INTO A SERVO CONTROL SYSTEM

(75) Inventors: Qingwei Jia, Singapore (SG); Shuyu Cao, Singapore (SG); Guoxiao Guo, Irvine, CA (US); Jie Yu, Irvine, CA (US)

(73) Assignee: Western Digitial Technologies, Inc., Irvine, CA (US)

( * ) Notice: Subject to any disclaimer, the term of this patent is extended or adjusted under 35 U.S.C. 154(b) by 298 days.

(21) Appl. No.: 13/585,679

(22) Filed: Aug. 14, 2012

(51) Int. Cl.
*G05B 5/01* (2006.01)
(52) U.S. Cl.
CPC .................................... *G05B 5/01* (2013.01)
(58) Field of Classification Search
USPC ......... 318/611, 651, 561, 618, 616, 560, 443; 360/75
See application file for complete search history.

(56) References Cited

U.S. PATENT DOCUMENTS

| 5,654,841 | A  |   | 8/1997  | Hobson et al. |
|-----------|----|---|---------|---------------|
| 6,606,213 | B1 |   | 8/2003  | Ooi et al. |
| 6,643,080 | B1 |   | 11/2003 | Goodner, III et al. |
| 7,660,701 | B2 |   | 2/2010  | Sharpe, Jr. |
| 7,667,919 | B1 | * | 2/2010  | Rigney et al. ............ 360/75 |

* cited by examiner

*Primary Examiner* — Karen Masih

(57) ABSTRACT

A disk drive is disclosed comprising a disk comprising a plurality of servo tracks defined by servo sectors recorded around the circumference of the disk at a servo sampling frequency, and a servo control system operable to actuate a head over the disk by generating a control signal applied to an actuator. A first sinusoid is injected into the servo control system and a first DC component (dc1) is measured in the control signal. A second sinusoid is injected into the servo control system and a second DC component (dc2) is measured in the control signal, wherein the second sinusoid comprises a phase offset from the first sinusoid. A resonance mode of the servo control system is measured based on dc1 and dc2.

14 Claims, 5 Drawing Sheets

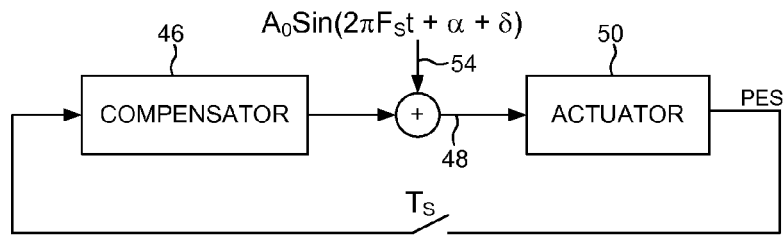
FIG. 4A
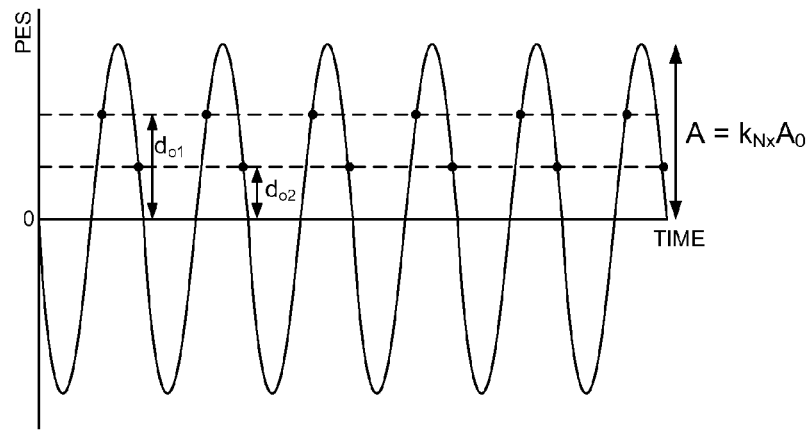
FIG. 4B
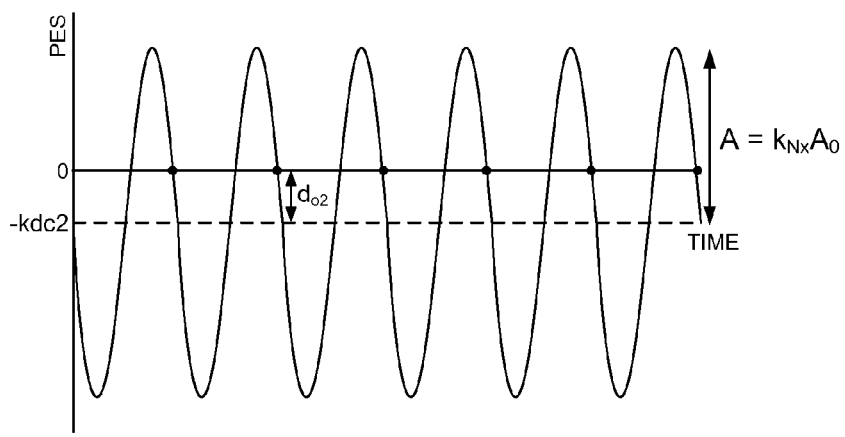
FIG. 4C
$$A = k\sqrt{(dc1)^2 + (dc2)^2}$$
FIG. 5

DISK DRIVE MEASURING A RESONANCE MODE BY INJECTING SINUSOIDS INTO A SERVO CONTROL SYSTEM

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 comprising a plurality of servo tracks 4 defined by a number of servo sectors $6_0$-$6_N$, wherein data tracks are defined relative to the servo tracks 4. Each servo sector 6, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track. Each servo sector 6, further comprises groups of servo bursts 14 (e.g., A, B, C and D bursts), which comprise a number of consecutive transitions recorded at precise intervals and offsets with respect to a servo track centerline. The groups of servo bursts 14 provide fine head position information used for centerline tracking while accessing a data track during write/read operations.

BRIEF DESCRIPTION OF THE DRAWINGS

FIG. 4A shows a second sinusoid injected into the servo control system according to an embodiment of the present invention.

FIGS. 4B and 4C illustrate a second DC component of the control signal generated by the servo control system in response to the injected second sinusoid.

FIG. 5 is an equation for computing the amplitude of the resonance mode of the servo control system according to an embodiment of the present invention.

DETAILED DESCRIPTION

Figure 2A:
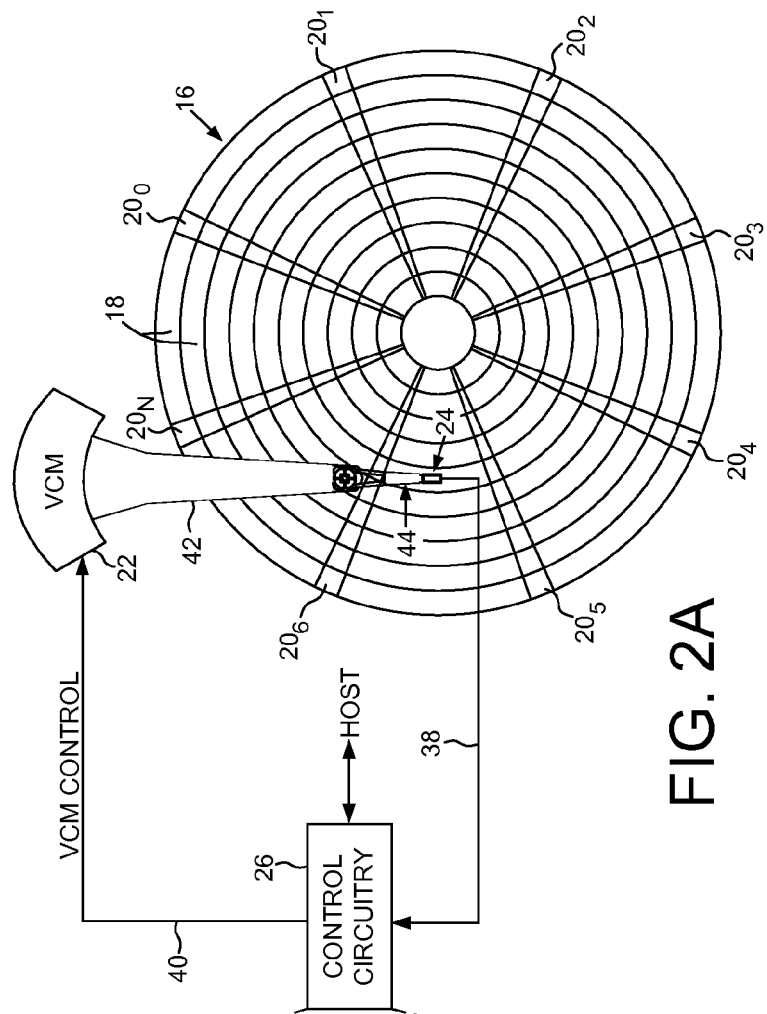
FIG. 2A shows a disk drive according to an embodiment of the present invention comprising a head actuated over a disk by a servo control system.
Figure 2B:
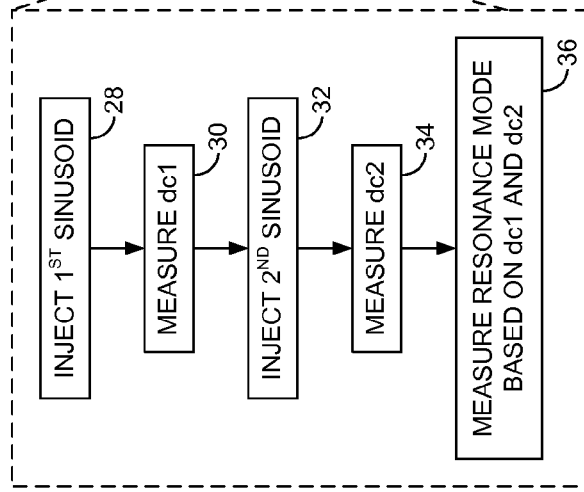
FIG. 2B is a flow diagram according to an embodiment of the present invention for measuring a resonance mode of the servo control system.

FIG. 2A shows a disk drive according to an embodiment of the present invention comprising a disk 16 comprising a plurality of servo tracks 18 defined by servo sectors $20_0$-$20_N$ recorded around the circumference of the disk 16 at a servo sampling frequency. The disk drive further comprises an actuator (e.g., a voice coil motor (VCM) 22) operable to actuate a head 24 over the disk 16, and control circuitry 26 comprising a servo control system operable to generate a control signal applied to the actuator. The control circuitry 26 executes the flow diagram of FIG. 2B, wherein a first sinusoid is injected into the servo control system (block 28), and a first DC component (dc1) is measured in the control signal (block 30). A second sinusoid is injected into the servo control system (block 32), and a second DC component (dc2) is measured in the control signal (block 34), wherein the second sinusoid comprises a phase offset from the first sinusoid. A resonance mode of the servo control system is measured based on dc1 and dc2 (block 36).

Figure 1:
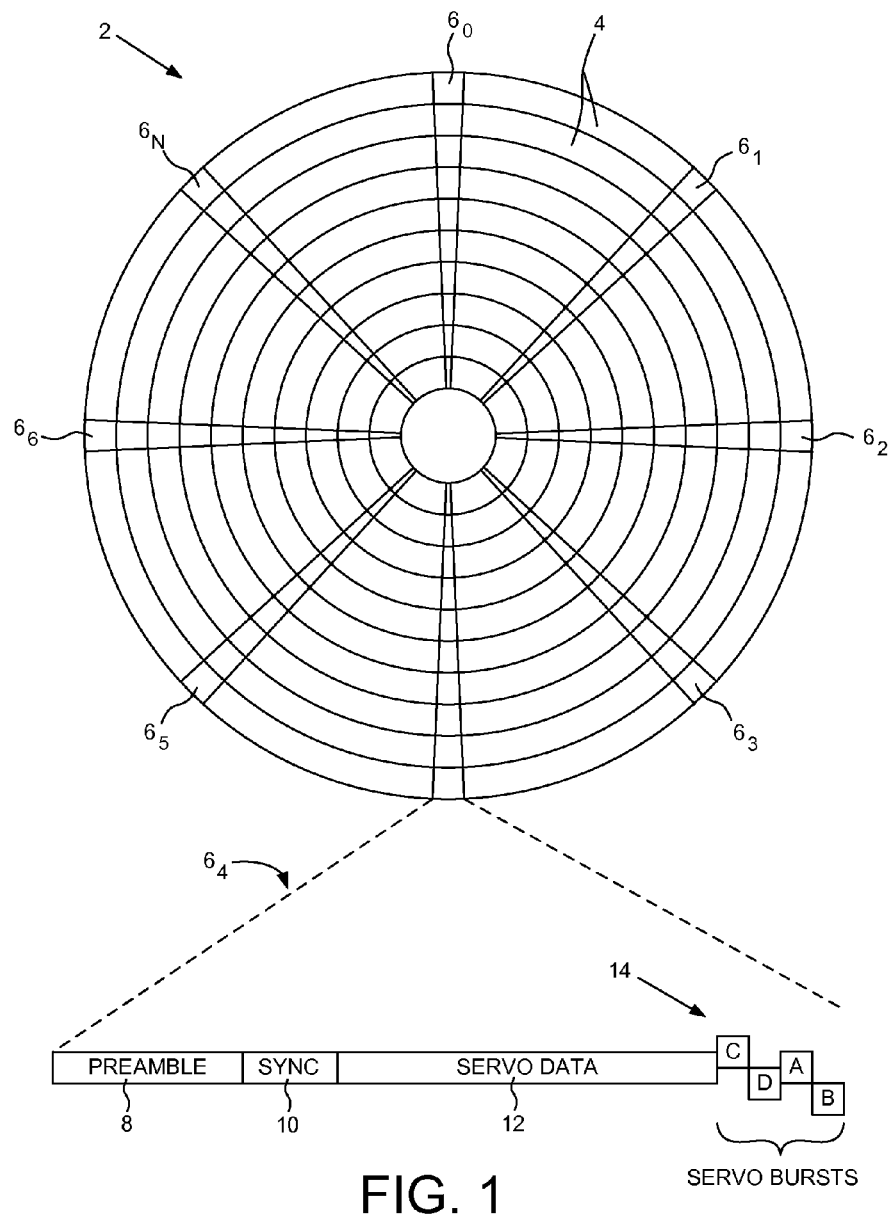
FIG. 1 shows a prior art disk format comprising a plurality of servo tracks defined by servo sectors.

In the embodiment of FIG. 2A, the control circuitry 26 processes a read signal 38 emanating from the head 24 to demodulate the servo sectors $20_0$-$20_N$ and generate a position error signal (PES) representing an error between the actual position of the head and a target position relative to a target track. The control circuitry 26 filters the PES using a suitable compensation filter to generate a control signal 40 applied to the VCM 22 which rotates an actuator arm 42 about a pivot in order to actuate the head 24 radially over the disk in a direction that reduces the PES. The servo sectors $20_0$-$20_N$ may comprise any suitable position information, such as a track address for coarse positioning and servo bursts for fine positioning. The servo bursts may comprise any suitable servo burst pattern, such as an amplitude based servo burst pattern (A,B,C,D quadrature pattern) shown in FIG. 1, or a phase based servo burst pattern (N,Q servo bursts).

In another embodiment, the actuator for actuating the head 24 over the disk 16 may comprise a microactuator, such as a piezoelectric (PZT) actuator. The microactuator may actuate a suspension 44 relative to the actuator arm 42, or the microactuator may actuate the head 24 relative to the suspension 44.

Figure 3A:
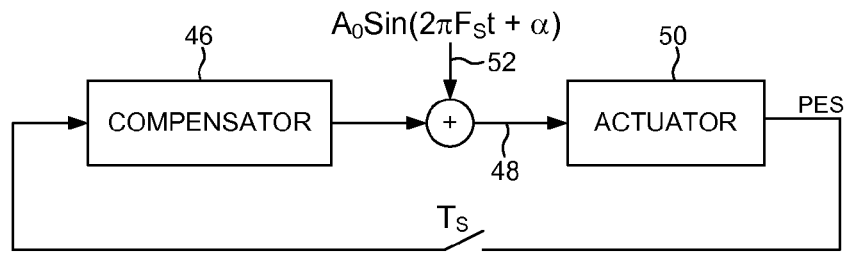
FIG. 3A shows a first sinusoid injected into the servo control system according to an embodiment of the present invention.
Figure 3B:
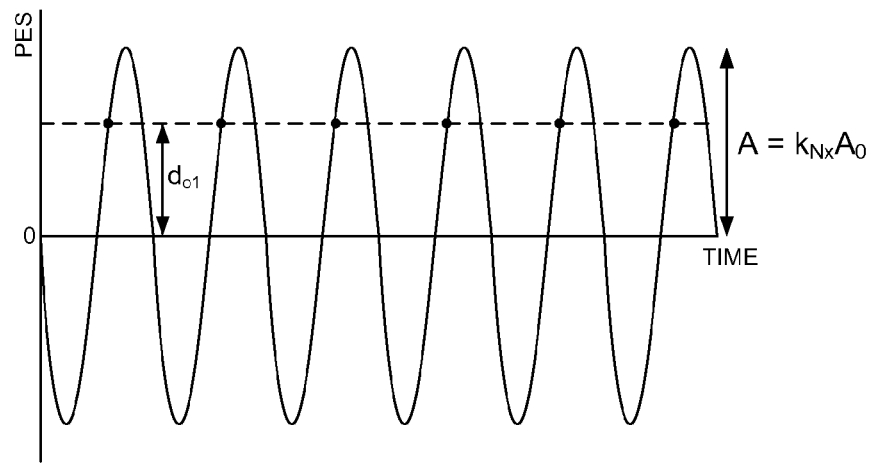
FIGS. 3B and 3C illustrate a first DC component of a control signal generated by the servo control system in response to the injected first sinusoid.
Figure 3C:
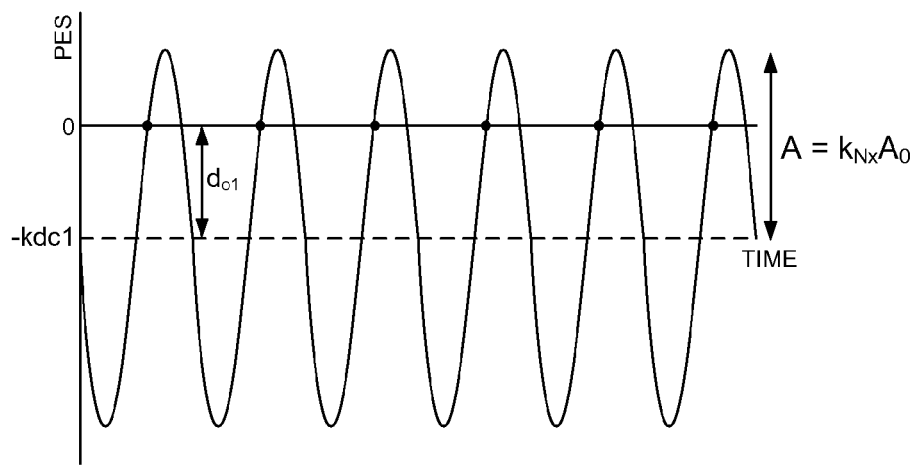

Regardless as to the type of actuator employed, the servo control system may exhibit resonance modes at certain frequencies which can amplify a corresponding disturbance affecting the PES. When a resonance mode exists at the sampling frequency of the servo sectors $20_0$-$20_N$, the corresponding sinusoidal disturbance in the PES will manifest as a DC component in the control signal of the servo control system. This is illustrated in FIG. 3B which shows how a sinusoidal disturbance in the PES at the sampling frequency of the servo sectors $20_0$-$20_N$ results in a DC component (do1) in the PES. The compensator 46 in the feedback path of the servo control system (FIG. 3A) typically comprises an integrator which forces the DC component (do1)) in the PES toward zero with a corresponding DC component in the control signal 48 applied to the actuator 50 as shown in FIG. 3C. The DC component in the control signal 48 will equal the DC gain (k) of the servo control system (the compensator 46) multiplied by a magnitude of a DC component (dc1) such that:

$$|d_{o1}| = k|d_{c1}|$$

Since the DC component (do1)) in the PES due to a resonance mode at the servo sector sampling frequency is driven to zero by the compensator 46 as shown in FIG. 3C, the PES cannot be evaluated to measure this resonance mode.

In an embodiment of the present invention, the resonance mode of the servo control system at the sampling frequency of the servo sectors $20_0$-$20_N$ is measured by evaluating the DC component of the control signal 48 applied to the actuator 50 (FIG. 3A) while injecting first and second sinusoids. A first sinusoid 52 is injected into the servo control system having an amplitude of $A_O$ and a frequency Fs substantially matching the sampling frequency of the servo sectors $20_0$-$20_N$. The effect of the first sinusoid 52 will be a sinusoidal disturbance in the PES having an amplitude of $k_{NX}A_o$ as shown in FIG. 3B, where $k_{NX}$ represents the gain of the resonance mode. A first DC component (dc1) in the control signal 48 is measured which will have a magnitude of kdc1 that drives the DC component (do1)) in the PES to zero as shown in FIG. 3C. The magnitude of the first DC component (dc1) in the control signal 38 will depend on the phase of the first sinusoid 52 relative to the phase of the servo sectors $20_0$-$20_N$. Since this phase relationship is unknown, the magnitude A of the sinusoidal disturbance cannot be determined from the first DC component (dc1) alone.

Therefore, a second sinusoid 54 is injected into the servo control system as shown in FIG. 4A, wherein the second sinusoid 54 comprises a known phase offset δ from the first sinusoid 52. The resulting DC component (do2) in the sinusoidal disturbance of the PES as shown in FIG. 4B will be driven to zero by the corresponding DC component (dc2) in the control signal 48 applied to the actuator 50 as shown in FIG. 4C (due to the integrator in the compensator 46 as described above). Due to the known phase offset δ between the first and second sinusoids, the amplitude of the second DC component (dc2) in the control signal 48 will be different from the amplitude of the first DC component (dc1) due to the different sampling phase of the sinusoidal disturbance in the PES (as long as the phase offset δ between the first and second sinusoids does not equal nπ). The amplitude A of the sinusoidal disturbance may then be measured based on the first and second DC components dc1 and dc2 using the following trigonometric relationship:

$$A = \sqrt{\left(\frac{kd_{c2} - kd_{c1}\cos\delta}{\sin\delta}\right)^2 + (kd_{c1})^2}$$

In one embodiment, the phase offset δ between the first and second sinusoids is selected to be nπ/2 (where n is an odd integer) so that the above equation for computing the amplitude A of the sinusoidal disturbance reduces to the equation shown in FIG. 5.

Figure 6:
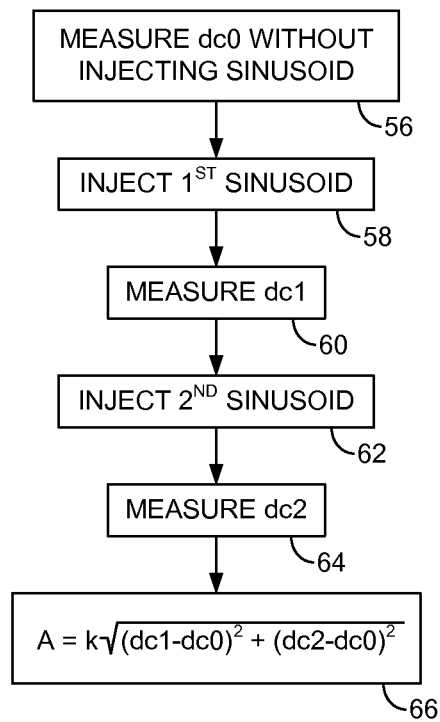
FIG. 6 is a flow diagram according to an embodiment of the present invention for measuring the first and second DC components of the control signal relative to a baseline DC component.

FIG. 6 shows a flow diagram according to an embodiment of the present invention wherein a third DC component (dc0) is measured in the control signal without injecting a sinusoid into the servo control system (block 56). After injecting the first sinusoid into the servo control system (bock 58) and measuring the first DC component (dc1) in the control signal (block 60) and injecting the second sinusoid into the servo control system (block 62) and measuring the second DC component (dc2) in the control signal (block 64), the resonance mode of the servo control system at the servo sector sampling frequency (the amplitude of the sinusoidal disturbance) is measured (block 66). Accordingly, in this embodiment the first and second DC components dc1 and dc2 are measured relative to a baseline DC component dc0 in the control signal.

In another embodiment of the present invention, the amplitude A of the sinusoidal disturbance corresponding to the resonance mode of the servo control system may be measured by sweeping the phase offset δ over multiple values while evaluating the DC component in the control signal 48. When the absolute value of the DC component reaches a maximum, it will correspond to the magnitude A of the sinusoidal disturbance of the resonance mode. That is, the phase offset δ is adjusted until the absolute magnitude of the resulting DC component (kdc1) in FIG. 3C reaches a maximum where the sampling points will occur at the peak of the sinusoid. In one embodiment, the phase offset δ is adjusted in coarse increments until its derivative changes sign. The phase offset δ is then adjusted in fine increments around this measurement in order to determine the phase offset δ that corresponds to a maximum in the DC component (kdc1).

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of servo tracks defined by servo sectors recorded around the circumference of the disk at a servo sampling frequency;
   a head;
   an actuator operable to actuate the head over the disk; and
   control circuitry comprising a servo control system operable to generate a control signal applied to the actuator, the control circuitry operable to:
      inject a first sinusoid into the servo control system and measure a first DC component dc1, in the control signal;
      inject a second sinusoid into the servo control system and measure a second DC component dc2, in the control signal, wherein the second sinusoid comprises a phase offset from the first sinusoid; and
      measure a resonance mode of the servo control system based on the dc1 and the dc2.

2. The disk drive as recited in claim 1, wherein a frequency of the sinusoid substantially matches the servo sampling frequency.

3. The disk drive as recited in claim 2, wherein the resonance mode is measured at substantially the servo sampling frequency.

4. The disk drive as recited in claim 2, wherein the control circuitry is further operable to:
   measure a third DC component dc0, in the control signal without injecting a sinusoid into the servo control system; and
   measure the dc1 and the dc2 relative to the dc0.

5. The disk drive as recited in claim 4, wherein the control circuitry is further operable to measure the resonance mode of the servo control system based on:

$$k\sqrt{(dc1)^2 + (dc2)^2}$$

where k represents a DC gain of the servo control system.

6. The disk drive as recited in claim 1, wherein the control circuitry is further operable to measure the resonance mode of the servo control system based on:

$$k\sqrt{(dc1)^2 + (dc2)^2}$$

where k represents a DC gain of the servo control system.

7. The disk drive as recited in claim 1, wherein the phase offset comprises $n\pi/2$ where n is an odd integer.

8. A method of operating a disk drive, the disk drive comprising a disk comprising a plurality of servo tracks defined by servo sectors recorded around the circumference of the disk at a servo sampling frequency, and a servo control system operable to actuate a head over the disk in response to a control signal, the method comprising:
   injecting a first sinusoid into the servo control system and measure a first DC component dc1, in the control signal;
   injecting a second sinusoid into the servo control system and measure a second DC component dc2, in the control signal, wherein the second sinusoid comprises a phase offset from the first sinusoid; and
   measuring a resonance mode of the servo control system based on the dc1 and the dc2.

9. The method as recited in claim 8, wherein a frequency of the sinusoid substantially matches the servo sampling frequency.

10. The method as recited in claim 9, wherein the resonance mode is measured at substantially the servo sampling frequency.

11. The method as recited in claim 9, further comprising:
   measuring a third DC component dc0, in the control signal without injecting a sinusoid into the servo control system; and
   measuring the dc1 and the dc2 relative to the dc0.

12. The method as recited in claim 11, further comprising measuring the resonance mode of the servo control system based on:

$$k\sqrt{(dc1)^2 + (dc2)^2}$$

where k represents a DC gain of the servo control system.

13. The method as recited in claim 8, further comprising measuring the resonance mode of the servo control system based on:

$$k\sqrt{(dc1)^2 + (dc2)^2}$$

where k represents a DC gain of the servo control system.

14. The method as recited in claim 8, wherein the phase offset comprises $n\pi/2$ where n is an odd integer.

* * * * *